(12) United States Patent
LaFauci et al.

(10) Patent No.: US 9,181,014 B2
(45) Date of Patent: Nov. 10, 2015

(54) ECOLOGICALLY SAFE STORAGE BAG AND TRANSPORTING SYSTEM AND METHOD OF MAKING SAME

(75) Inventors: Mariagrazia LaFauci, Philadelphia, PA (US); Diana Menaged, Ambler, PA (US)

(73) Assignee: BeSatori LLC, Philadelphia, PA (US)

( * ) Notice: Subject to any disclaimer, the term of this patent is extended or adjusted under 35 U.S.C. 154(b) by 357 days.

(21) Appl. No.: 12/936,037

(22) PCT Filed: Jan. 12, 2010

(86) PCT No.: PCT/US2010/020740
§ 371 (c)(1),
(2), (4) Date: Oct. 1, 2010

(87) PCT Pub. No.: WO2010/081135
PCT Pub. Date: Jul. 15, 2010

(65) Prior Publication Data
US 2011/0026854 A1 Feb. 3, 2011

Related U.S. Application Data

(60) Provisional application No. 61/143,941, filed on Jan. 12, 2009.

(51) Int. Cl.
*B65D 33/25* (2006.01)
*B65D 81/32* (2006.01)
(Continued)

(52) U.S. Cl.
CPC ............ *B65D 81/3266* (2013.01); *B65D 31/12* (2013.01); *B65D 33/2508* (2013.01); *B65D 65/466* (2013.01); *C08L 23/0815* (2013.01); *B29C 47/0026* (2013.01);
(Continued)

(58) Field of Classification Search
CPC .............. B65D 33/25; B65D 33/2533; B65D 33/2541; B65D 33/2516; B65D 33/255; B65D 33/2558; B65D 33/2591; B65D 33/2508; B65D 33/2525; B65D 33/2566
USPC .......................... 383/1, 32, 40, 61.2, 63, 37, 38
See application file for complete search history.

(56) References Cited

U.S. PATENT DOCUMENTS 4,046,408 A * 9/1977 Ausnit .......................... 285/188
4,285,105 A   8/1981 Kirkpatrick
(Continued)

FOREIGN PATENT DOCUMENTS

EP   0978455 A2   2/2000
EP   0984039 A1   3/2000
(Continued)

OTHER PUBLICATIONS

ECMBIOFILMSJAN2000.*

*Primary Examiner* — Jes F Pascua
*Assistant Examiner* — Nina Attel
(74) *Attorney, Agent, or Firm* — Rahman LLC (57) ABSTRACT

The present invention is directed to a storage system including a biodegradable plastic material that can be used in applications where biodegradability and biocompatibility are among primary desirable features, while having qualities which are desired for the various uses of the storage system. The present invention includes process to make the storage system and for transporting article wherein they can be stored at their destination.

18 Claims, 6 Drawing Sheets

(51) Int. Cl.
  *B65D 30/22*  (2006.01)
  *B65D 65/46*  (2006.01)
  *C08L 23/08*  (2006.01)
  *B29C 47/00*  (2006.01)

(52) U.S. Cl.
  CPC ........ *B29C 47/0059* (2013.01); *B29C 47/0066* (2013.01); *B29C 2793/0063* (2013.01); *C08L 23/0853* (2013.01); *Y02W 90/13* (2015.05)

(56) References Cited

U.S. PATENT DOCUMENTS

| | | | |
|---|---|---|---|
| 4,410,130 A | 10/1983 | Herrington | |
| 4,415,087 A | 11/1983 | Clayton et al. | |
| 4,519,095 A | 5/1985 | Clayton | |
| 4,601,694 A * | 7/1986 | Ausnit | 493/381 |
| 4,637,061 A * | 1/1987 | Riese | 383/38 |
| 4,673,383 A * | 6/1987 | Bentsen | 493/381 |
| 4,708,243 A | 11/1987 | Nailon | |
| 4,735,308 A | 4/1988 | Barner | |
| D297,306 S | 8/1988 | King | |
| 4,787,880 A * | 11/1988 | Ausnit | 493/213 |
| 5,102,234 A | 4/1992 | Levy | |
| D339,740 S | 9/1993 | Lee | |
| 5,248,201 A | 9/1993 | Kettner et al. | |
| 5,258,422 A | 11/1993 | Chang et al. | |
| 5,356,222 A | 10/1994 | Kettner et al. | |
| 5,403,094 A * | 4/1995 | Tomic | 383/63 |
| 5,470,526 A | 11/1995 | Wilfong et al. | |
| 5,509,734 A * | 4/1996 | Ausnit | 383/63 |
| 5,832,145 A | 11/1998 | Dais et al. | |
| 5,975,394 A | 11/1999 | Shuval | |
| 6,074,096 A * | 6/2000 | Tilman | 383/63 |
| 6,138,329 A * | 10/2000 | Johnson | 24/584.1 |
| 6,167,597 B1 * | 1/2001 | Malin | 24/585.1 |
| 6,874,938 B2 | 4/2005 | Price et al. | |
| 6,953,542 B2 | 10/2005 | Cisek | |
| 6,962,439 B2 | 11/2005 | Taheri | |
| D540,693 S | 4/2007 | Smalls | |
| D541,171 S | 4/2007 | Delmotte et al. | |
| D541,668 S | 5/2007 | Pokusa et al. | |
| 7,213,305 B2 | 5/2007 | Stolmeier et al. | |
| D545,217 S | 6/2007 | Jeric et al. | |
| D555,009 S | 11/2007 | Lin | |
| 7,291,664 B2 | 11/2007 | Hao | |
| 7,452,131 B2 | 11/2008 | Kettner et al. | |
| D595,593 S | 7/2009 | Schreiter et al. | |
| D597,857 S | 8/2009 | Lin | |
| D602,377 S | 10/2009 | Lin | |
| D612,743 S | 3/2010 | Bradley | |
| D613,615 S | 4/2010 | Hedstrom | |
| D617,654 S | 6/2010 | Tawinsook | |
| D623,075 S | 9/2010 | Blythe | |
| D623,536 S | 9/2010 | Bohmke | |
| 7,997,543 B1 | 8/2011 | Campbell | |
| 2001/0027225 A1 * | 10/2001 | Downie | 523/124 |
| 2003/0121597 A1 * | 7/2003 | John | 156/216 |
| 2003/0191210 A1 | 10/2003 | Autran | |
| 2004/0034149 A1 | 2/2004 | Garcia | |
| 2004/0047524 A1 | 3/2004 | Stolmeier et al. | |
| 2004/0225269 A1 | 11/2004 | Zhao et al. | |
| 2005/0105832 A1 | 5/2005 | Trinko | |
| 2005/0136155 A1 | 6/2005 | Jordan et al. | |
| 2005/0276524 A1 | 12/2005 | Taheri | |
| 2006/0078232 A1 | 4/2006 | Trinko | |
| 2006/0159918 A1 * | 7/2006 | Dugan et al. | 428/364 |
| 2006/0285773 A1 * | 12/2006 | Shaffer et al. | 383/1 |
| 2007/0098308 A1 | 5/2007 | Taheri | |
| 2007/0140600 A1 | 6/2007 | Nowak et al. | |
| 2007/0207186 A1 | 9/2007 | Scanlon et al. | |
| 2008/0031554 A1 * | 2/2008 | Taheri | 383/204 |
| 2008/0103232 A1 * | 5/2008 | Lake et al. | 523/124 |
| 2008/0105679 A1 | 5/2008 | Ballard | |
| 2008/0107781 A1 | 5/2008 | Carroll | |
| 2008/0121256 A1 * | 5/2008 | Zonsius | 135/15.1 |
| 2008/0175520 A1 | 7/2008 | Simon | |
| 2008/0226203 A1 * | 9/2008 | Dais et al. | 383/63 |
| 2009/0034885 A1 * | 2/2009 | McGruder | 383/37 |
| 2009/0136161 A1 | 5/2009 | Hickey | |
| 2009/0190862 A1 | 7/2009 | Barksdale et al. | |
| 2009/0283578 A1 * | 11/2009 | Miller | 229/80.5 |
| 2009/0297069 A1 | 12/2009 | Bray | |
| 2010/0021091 A1 * | 1/2010 | Fratti et al. | 383/63 |
| 2010/0142861 A1 * | 6/2010 | Sam | 383/38 |
| 2010/0147425 A1 | 6/2010 | Swain et al. | |

FOREIGN PATENT DOCUMENTS

| | | |
|---|---|---|
| EP | 1008629 A1 | 6/2000 |
| EP | 1198338 B1 | 12/2003 |
| FR | 2905115 A1 | 2/2008 |
| JP | 05-096687 A | 4/1993 |
| JP | 11-268751 A | 10/1999 |
| JP | 2000239454 A | 9/2000 |
| JP | 2007-130043 A | 5/2007 |
| WO | WO9638494 A1 | 12/1996 |
| WO | WO9808891 A1 | 3/1998 |
| WO | WO9905207 A1 | 2/1999 |
| WO | WO03033370 A1 | 4/2003 |
| WO | WO2006042364 A1 | 4/2006 |
| WO | WO2006/127739 A2 | 11/2006 |
| WO | WO2006/134561 A1 | 12/2006 |
| WO | WO2007118280 A1 | 10/2007 |
| WO | WO2007144576 A2 | 12/2007 |
| WO | WO2008/094264 A1 | 8/2008 |

* cited by examiner

ECOLOGICALLY SAFE STORAGE BAG AND TRANSPORTING SYSTEM AND METHOD OF MAKING SAME

CROSS-REFERENCE TO RELATED APPLICATIONS

This application claims priority to PCT Application No. PCT/US2010/020740 filed on Jan. 12, 2010, which claims priority to U.S. Provisional Application No. 61/143,941 filed on Jan. 12, 2009, the complete disclosures of which, in their entireties, are herein incorporated by reference.

FIELD OF THE INVENTION

This invention relates generally to an ecologically friendly biodegradable storage system which can be used for storing and transporting a variety of articles.

BACKGROUND OF THE INVENTION

Containers and bags used for storing and transporting articles have established a place in daily life. These containers and bags can be used for a child's lunch or for various medical equipment and medical specimens having specific requirements.

It is recognized in the industry that plastic films used in the manufacture of these bags and containers are superior in transparency and heat seal-ability as required in general packaging applications. Transparency is normally indicated in terms of light beam transmittance, the higher the transmittance, the better the transparency. Films with a high level of transparency are preferred as packaging material because the contents are visible from the outside.

Commonly, conventional plastic products, particularly packaging materials and "bags" are discarded soon after use resulting in disposal problems, which are numerous and must be recognized as an issue for an ecologically conscious society. Most particularly, general packaging plastics, polyethylene, polypropylene, polyethylene terephthalate (PET), etc. can be cited as problematic. These materials are high in calorific value produced during burning, which may result in incineration problems. In addition, polyvinyl chloride is resistant to burning based on its self-extinguishing property. Therefore, plastic products and materials are buried as method of disposal. Due to their chemical and biological stability, they decompose very slowly. Thus, it would be an ecologic benefit to produce plastic films used to make common bags and containers low in calorie, decompose in the soil, and are safe.

There have been many attempts to make degradable articles, however, because of costs, the difficulty in processing, and end-use properties, there has been little commercial success. Many compositions that have excellent degradability have only limited process-ability. Conversely, compositions which are processed easily have reduced degradability.

This invention is directed to a storage system which includes unique plastic materials that can be used in applications where biodegradability and biocompatibility are among primary desirable features of such applications, while having qualities which are desired for the various uses of the storage system. Further, their products must be a commercially viable method based on cost and is ecologically friendly.

BRIEF SUMMARY OF THE INVENTION

In a first embodiment, the invention is directed to an ecologically friendly storage system including a biodegradable plastic bag material, wherein the biodegradable plastic material consists essentially of a low density polyethylene, a biodegradable plastic additive; and a polymer softening additive. The storage system includes at least one individual storage compartment made of the biodegradable plastic bag material, having an exterior and interior side, wherein at least one sealable device is attached to a first side and a second side of the interior side.

In another embodiment, the invention is directed to a process for an ecologically friendly storage system including the steps of (a) placing low-density polyethylene polymer pellets into a clean tumbling mixer; (b) adding the appropriate amount of polymer softening additive and a biodegradable plastic additive in to the mixer; (c) mixing the polymer and additives in the tumbling mixer for at least half an hour; (d) moving the polymer from the mixer to a hopper of an extrusion machine; (e) pushing a resultant biodegradable plastic material of (a) through (d) through the injection head of the extruder while the mixed polymer is melted inside the injection head; (f) pushing the biodegradable plastic material through a circular die, forming a thin tube; (g) flattening the tube passing it through converging slats and rollers to form at least one individual storage compartment; (h) slitting the flattened tube on one or both sides to form the opening of the bag; and (i) running the flattened tube through a side sealing machine to seal the sides and separate to form individual bags.

In yet another embodiment, the invention is directed to an ecologically friendly storage system including a degradable plastic material having at least one of (i.) a low density polyethylene, (ii.) a biodegradable plastic additive; or (iii.) a polymer softening additive. Further, the system has at least one individual storage compartment including the degradable plastic material having an exterior and interior side, wherein at least one sealable device is attached to a first side and a second side of the interior side.

DETAILED DESCRIPTION OF THE INVENTION

Certain terminology is used herein for convenience only and is not to be taken as a limitation on the present invention. The terminology includes the words specifically mentioned, derivatives thereof and words of similar import. The embodiments discussed herein are not intended to be exhaustive or to limit the invention to the precise form disclosed. These embodiments are chosen and described to best explain the principle of the invention and its application and practical use and to enable others skilled in the art to best utilize the invention.

Figure 1:
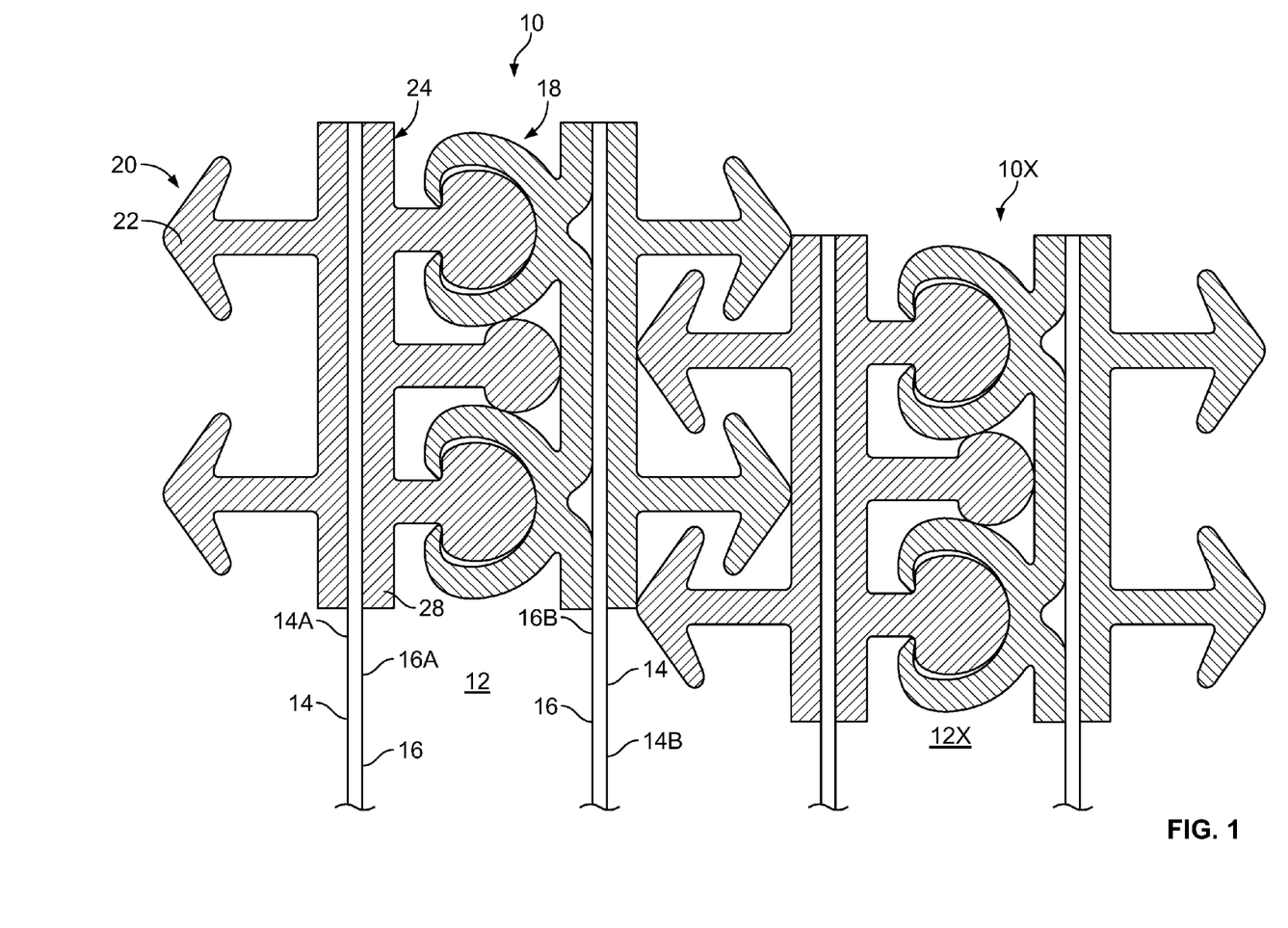
FIG. 1 is a partial side view of a first embodiment of a storage system of the present invention, illustrating the attachment to a second system.
Figure 1A:
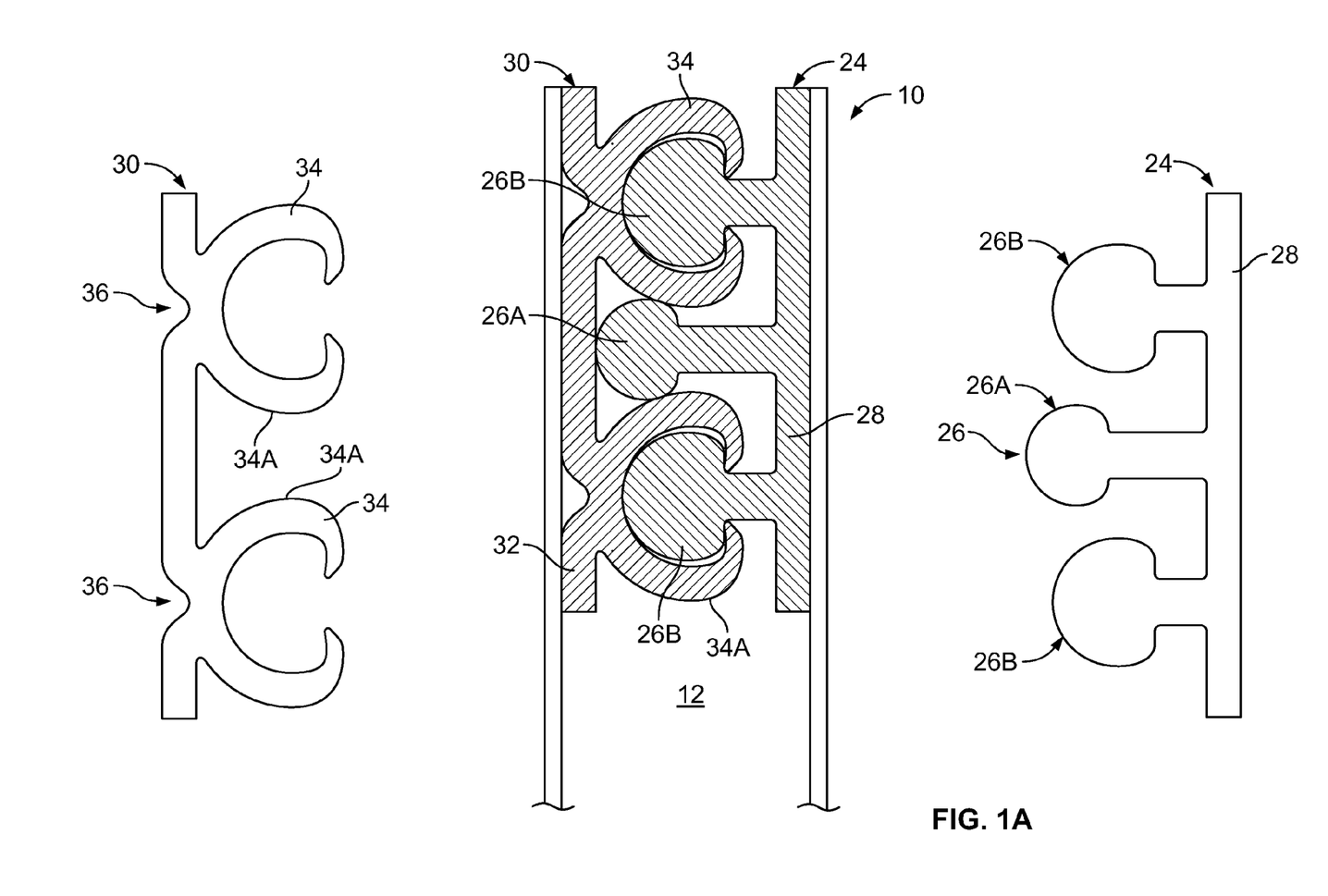
FIG. 1A is an exploded side view of a first embodiment of a storage system of the present invention, illustrating the sealable device.

In a first embodiment, the invention is directed to an ecologically friendly storage system including a biodegradable plastic bag material, wherein the biodegradable plastic material consists essentially of a low density polyethylene, a biodegradable plastic additive; and a polymer softening additive. Referring to FIGS. 1 and 1A, the storage system 10 includes at least one individual storage compartment 12 made of the biodegradable plastic bag material, having an exterior 14 and interior side 16, wherein at least one sealable device 18 is attached to a first side 16A and a second side 16B of the interior side 16. In addition, the storage system 10 includes at least one attachment means 20 attached to a first exterior side 14A of the individual storage compartment 12. As illustrated in FIG. 1, an attachment means most commonly extends from the first exterior side 14A and a second exterior side 14B.

In the first embodiment of the storage system, the low density polyethylene is about 93.1 to about 94.9 percent by weight of the biodegradable plastic material, the biodegradable plastic additive is about 0.5 to about 1.9 percent by weight of the biodegradable plastic material, and the polymer softener additive is about 4.1 to about 5.9 percent by weight of the biodegradable plastic material. Further, this formulation produces a biodegradable plastic which degrades at least 99 percent in 5 years in an aerobic or anaerobic environment when the biodegradable plastic material has a thickness of about 0.04 mm to about 0.06 mm.

It will be appreciated by those of skill in the art that modifications of the components will result in modifications to characteristics of the properties of the material. Thus, the present formulation is unique to capture the desire characteristics in addition to the biodegradable properties for its intended use. Further, as can appreciated by those of skill in the art, the formulation of the biodegradable plastic material must appreciate the horizontal stress, e.g. stress made by the seal 18 and attachment 20 devices simultaneously with the vertical weight of any contents of the storage compartments 12, 12X.

In the first embodiment, the storage system 10 includes an attachment means 20 incorporating a plurality of extending interlocking projections 22. The plurality of interlocking projections 22 are most preferably arrow-like projections, wherein the arrow-head is sized to allow perpendicular/horizontal movement of the individual storage compartment 12 in the "interlocked" position attached to another storage system 10X. Based on the design of the system 10 multiple attachments are possible to a plurality of systems 10X, thus it is appreciated that multiple systems can exist extending horizontally from the sealable device 18.

In a first embodiment, the sealable device 18 is comprised of a male section 24 having a plurality of extending projections 26A, 26B extending from a base 28 attached to the first interior side 16A of the individual storage compartment 12, wherein at least one the of the extending projections 26A is longer than the other extending projections 26B. A female section 30 extending from a base 32 attached to the second interior side 16B of the individual storage compartment 12 has a plurality of accepting cuffs 34, wherein the accepting cuffs 34 are positioned to receive the other extending projections 26B and secure the at least one the of the extending projections longer than the other extending projections 26A against an exterior portion 34A of adjacent accepting cuffs. The female section 30 of the sealable device 18 define apertures 36 aligned substantially central to each accepting cuff 34. This is specifically designed to allow attachment and release by the female section 30 without excess stress on the biodegradable material, thereby, avoiding "tearing" which would render the "bag" useless. It should be noted that the use of the "aperture design" coincides with formulation which produces a material having the characteristics of (horizontal) designed stress, texture and clarity as discussed herein.

Figure 2:
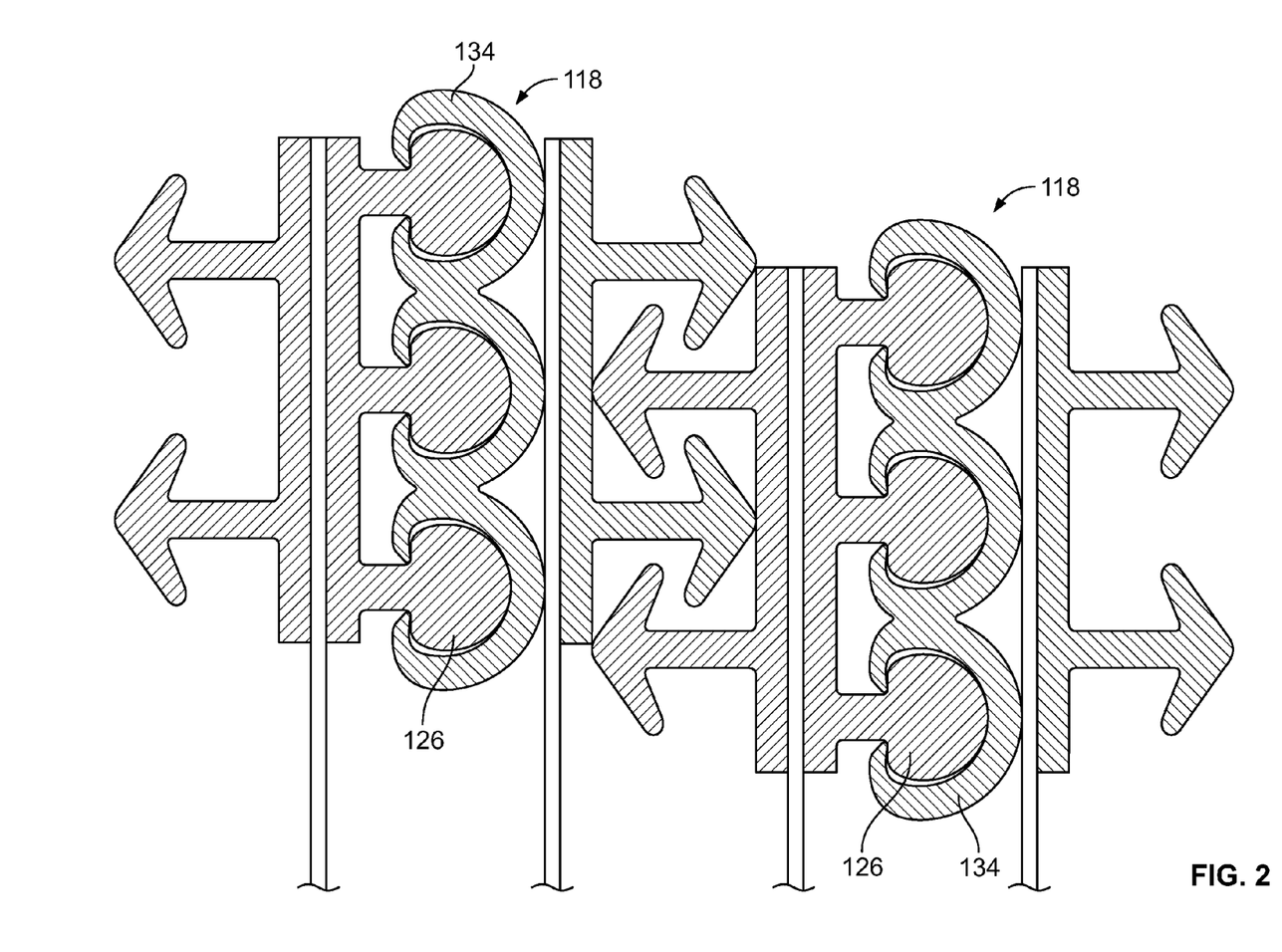
FIG. 2 is a side view of an alternate design of the first embodiment of a storage system according to the present invention illustrating the attachment to a second system.

Referring to FIG. 2, a variation of the sealable device 118 is illustrated wherein the projections 126 are of equivalent size and each is secured within an accepting cuff 134 aligned to receive the projections 126.

Figure 3:
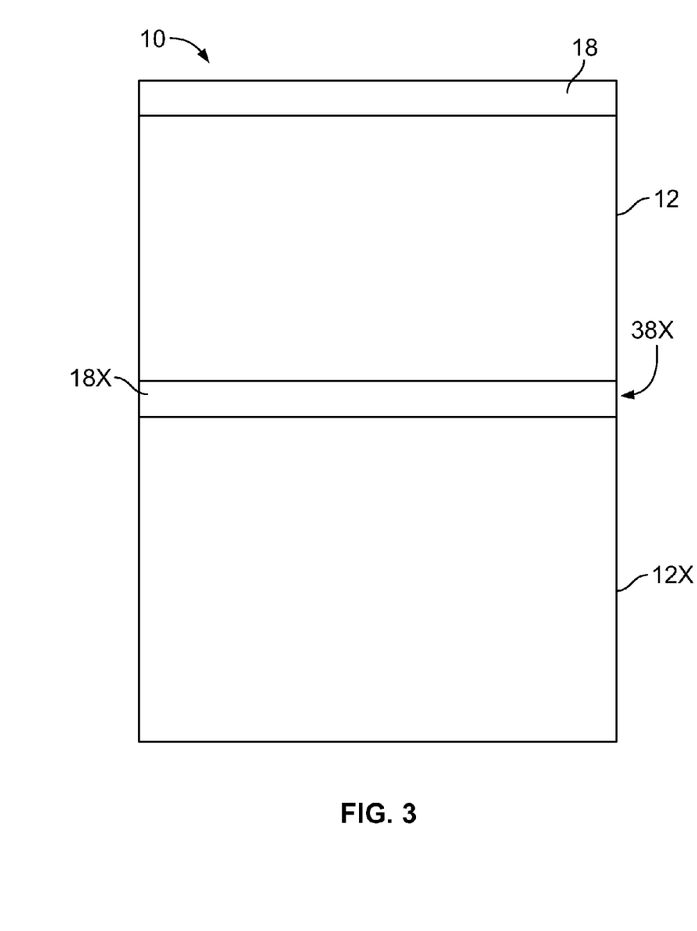
FIG. 3 is a plan view of an alternate design of the first embodiment of a storage system illustrating a second individual storage compartment divided by a sealable device.

Referring to FIG. 3, in another variation of the first embodiment, the storage system 10 comprises a second compartment 12X having a sealable device 18X on a first end 38X, wherein the at least one individual storage compartment 12 and the second compartment 12X are continuous but divided by the second sealable device 18X. The second sealable device 18X allows access from the individual storage compartment 12 in the disengaged position or can act as a "seal" in the engaged configuration. One of skill in the art would appreciate that additional individual compartments 12X can be added, thereby expanding the system 10 in the vertical direction based on the location of the sealable device 18X.

Figure 4:
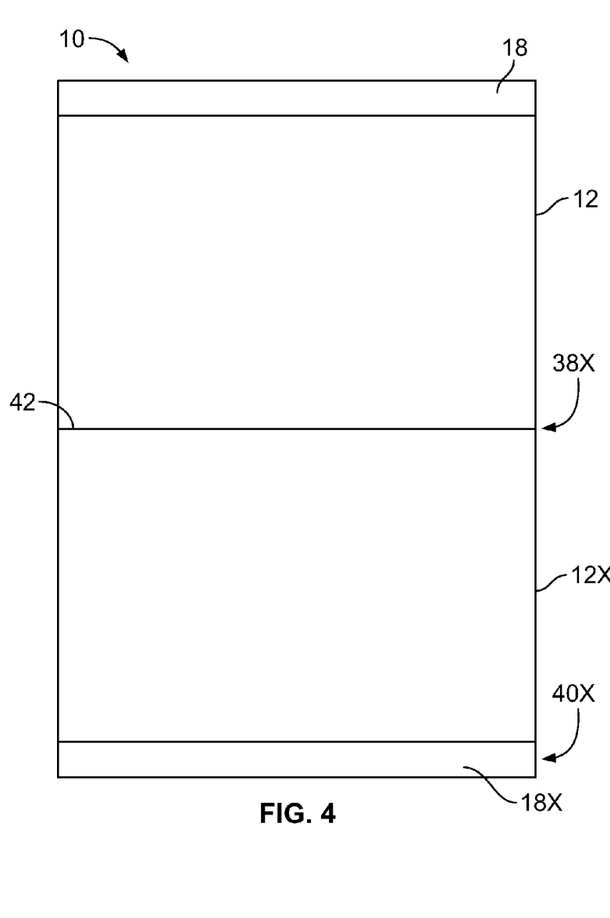
FIG. 4 is a plan view of another alternate design of the first embodiment of a storage system illustrating a second individual storage compartment separated by a partition.

Referring to FIG. 4, in yet another variation of the first embodiment, the second sealable device 18X is positioned on a second end 40X of the second storage compartment 12X, wherein the first 12 and second 12X storage compartments are separated by a partition 42. Thus communication is prohibited of the first 12 and second 12X compartments. Thus, there can be no mixing of the content of the individual storage compartment 12 and the second storage compartment 12X.

Figure 4A:
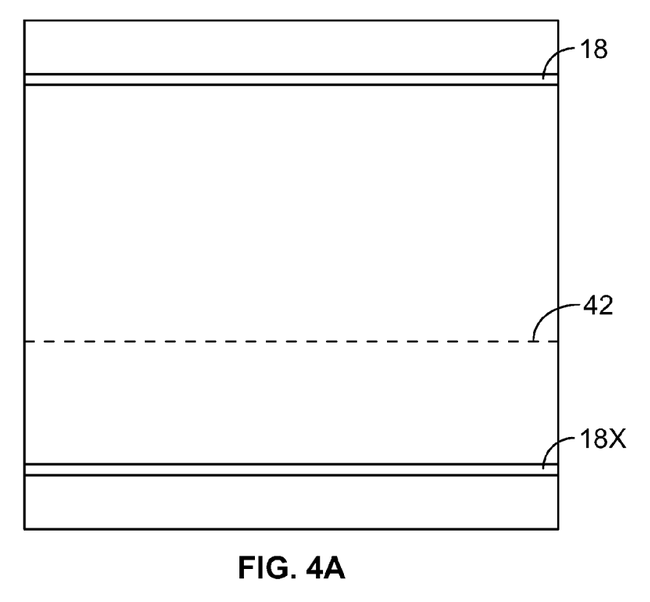
FIG. 4A is a plan view of an alternate configuration of the storage system of FIG. 4, illustrating the system intact.
Figure 4B:
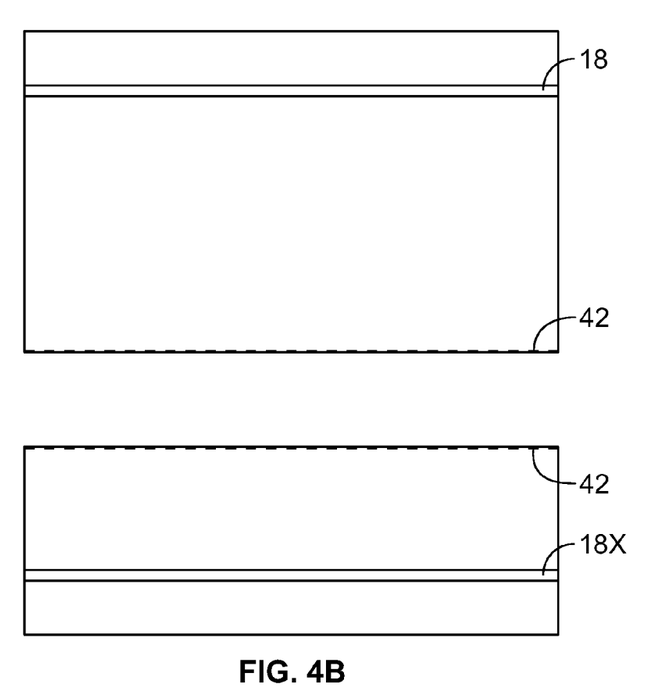
FIG. 4B is a plan view of the alternate configuration of the storage system of FIG. 4A, illustrating the system detached.

Referring to FIGS. 4A and 4B, other variations of this embodiment are illustrated wherein the partition 42 is perforated and detachable and positioned askew to a median position between the sealable devices 18, 18X.

It should be appreciated the use of multiple compartments (extending vertical to the sealing device) and additional systems (extending horizontal to the sealing device) allows the reduction of materials, thus resulting in reduced costs to the consumer and reduced ecological stress based on degradation requirements. Further, the invention reduces waste by reducing the consumption at the end use level by having multiple versatility which allows usability for separation and storing multiple items in 1 transporting system.

In another embodiment, the invention is directed to a process to produce a storage system including the steps of (a) placing low-density polyethylene polymer pellets into a clean tumbling mixer; (b) adding the appropriate amount of polymer softening additive and a biodegradable plastic additive in to the mixer; (c) mixing the polymer and additives in the tumbling mixer for at least half an hour; (d) moving the polymer from the mixer to a hopper of an extrusion machine; (e) pushing a resultant biodegradable plastic material of (a) through (d) through the injection head of the extruder while the mixed polymer is melted inside the injection head; (f) pushing the biodegradable plastic material through a circular die, forming a thin tube; (g) flattening the tube passing it through converging slats and rollers to form at least one individual storage compartment; (h) slitting the flattened tube on one or both sides to form the opening of the bag; and (i) running the flattened tube through a side sealing machine to seal the sides and separate to form individual bags.

Additionally, the process could include expanding the size of the tube by introducing air prior to (g). Though it is appreciated that no contaminants should exist, any contaminants which exist should be removed, most preferably after step (e).

In this embodiment, the low density polyethylene is about 90 to about 99 percent by weight of the biodegradable plastic material, the biodegradable plastic additive is about 0.2 to about 5 percent by weight of the biodegradable plastic material and the polymer softener additive is about 0.8 to about 10 percent by weight of the biodegradable plastic material. The plastic biodegradable biodegrades at least 99 percent in 5 years in anaerobic or aerobic environment and has a thickness of about 0.04 mm to about 0.10 mm.

Most particularly, the low density polyethylene is 94.0 percent by weight of the biodegradable plastic material, the biodegradable plastic additive is 1.0 percent by weight of the biodegradable plastic material and the polymer softener is 5.0 percent by weight of the biodegradable plastic material. This most particular designation of components results in a biodegradable plastic material that has a luminous transmittance of about 90.4 percent.

Similar to the previous embodiment and illustrated in FIGS. 1 and 1A, the process of this embodiment forms a storage system (not shown), wherein at least one individual storage compartment comprising the biodegradable plastic bag material has an exterior and interior side, wherein at least one sealable device is attached to a first side and a second side of the interior side and at least one attachment means is attached to a first exterior side of the individual storage compartment.

One of skill in the art would appreciate the sealable device and the attachment means can be formed during the extrusion process or can be attached later, in the appropriate location of the individual storage compartment. Specifically, there are 3 different processes of adding the sealable device and the attachment means to the system; 1) they are formed separately, and later laminated on to the system by heat, 2) they are a part of the direct extrusion, e.g. they are formed with the biodegradable plastic material formed in the same circular die that forms the system or "a bag", and 3) they are formed in a secondary stage of the extrusion and formed by a separate die, wherein formation of the sealable device and the attachment means is substantially at the same time of the extrusion of the biodegradable plastic material. This process requires a separate hopper to hold the material of the sealable device and the attachment means and a separate injection gun to inject the material into the necessary die. This method is used when different colors are desired for the sealable device and/or attachment means and the biodegradable plastic material.

By the process of this embodiment, a storage system is produced (not shown) wherein at least one individual storage compartment, made of the biodegradable plastic material has an exterior and interior side, wherein at least one sealable device is attached to a first side and a second side of the interior side. Similar to the previous embodiments and illustrated in FIGS. 1 and 1A, the at least one attachment means is attached to a first exterior side of the individual storage compartment, wherein the attachment means includes a plurality of extending interlocking projections. The sealable device includes a male section having a plurality of extending projections extending from a base attached to the first interior side of the individual storage compartment, wherein at least one the of the extending projections is longer than the other extending projections. A female section extending from a base attached to the second interior side of the individual storage compartment has a plurality of accepting cuffs, wherein the accepting cuffs are positioned to receive the other extending projections and secure the at least one the of the extending projections longer than the other extending projections against an exterior portion of adjacent accepting cuffs.

One skilled in the art would appreciate a second storage device could be attached via the attachment device; and the storage system is transported with the attached first and second storage devices as a single unit. In the storage system of this embodiment, the plastic material will not contaminate any article contained therein and will allow a first and second storage system to be stored at the same temperatures or the first and second storage systems can be stored at different temperatures. Further, it is recognized that the first and second storage systems biodegrade in an aerobic or anaerobic environment at the same rate of time.

Figure 5:
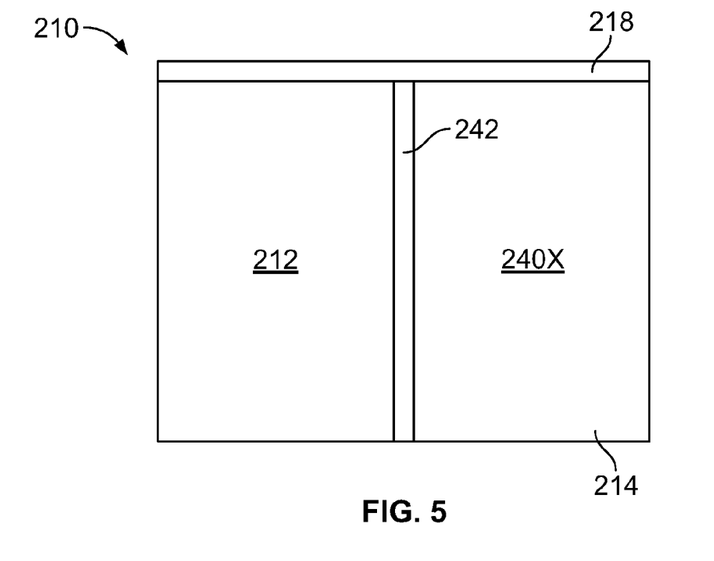
FIG. 5 is a plan view of another embodiment of the storage system of the present invention.
Figure 5A:
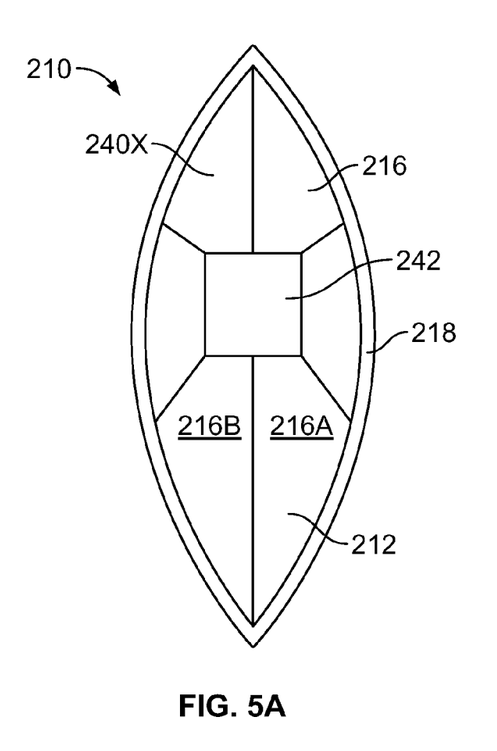
FIG. 5A is a top view of the embodiment of the storage system in FIG. 5.

Referring to FIGS. 5 and 5A, in yet another embodiment, the invention is directed to an ecologically friendly storage system 210 including a degradable plastic material having at least one of (i.) a low density polyethylene, (ii.) a biodegradable plastic additive; or (iii.) a polymer softening additive. Further, the system 210 has at least one individual storage 212 compartment including the degradable plastic material having an exterior 214 and interior side 216, wherein at least one sealable device 218 is attached to a first side 216A and a second side 216B of the interior side 216. The storage system 210 may include a second compartment 240X, wherein the at least one individual storage compartment 212 and the second compartment 240X are separated by a partition 242 positioned substantially perpendicular to the at least one sealable device 218. The partition 242 may be a varied distance from the sealable device 218 and either centered in regard to the sealable device 218 or askew. The partition 242 may allow communication between the at least one storage compartment 212 and the second compartment 240X will operate independently of the sealable device 218. One skilled in the art would recognize that the sealable device 218 in this embodiment could be modified to be two separated (identical or nonidentical) sealing devices (not shown) allowing the complete separation of the partitioned sections 212 and 240X, as illustrated in the present embodiment, thus forming two separate bags (not shown).

EXAMPLE 1

In a first example of the biodegradable plastic material, the low density polymer is low density polyethylene (LDPE) and is 94.0 percent of the biodegradable plastic material, the polymer softening material is ethylene vinyl acetate (EVA) and is 5.0 percent by weight of the biodegradable plastic material, and the biodegradable additive is ECM Masterbatch pellets produced by ECM Biofims Inc. of Plainsville, Ohio (USA), and is 1.0 percent by weight of the biodegradable plastic material. The biodegradable plastic material of this Example 1, is produced by the method as described herein. The biodegradable plastic material of Example 1 has the following characteristics defined in Table 1.

TABLE 1

| No. | Test item | Test method | Test condition | Result | |
|---|---|---|---|---|---|
| 1 | Tensile strength | American Society for Testing and Materials ("ASTM") D882-02 | Width: 25 millimeters ("mm") Test speed: 50 mm/minutes ("min") Grip separation: 50 mm | machine direction ("MD") cross direction ("CD") | 25.3 MegaPascal "MPa" 10.5 MPa |
| 2 | Tear strength | ASTM D1004-07 | Thickness: 0.048 mm | MD CD | 4.8 Newton ("N") 3.3 N |
| 3 | Total luminous transmittance | ASTM D1003-07e1 method A | Thickness: 0.048 mm | 90.4% | |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A plastic storage bag system comprising a plurality of plastic bags operatively connected to one another, wherein each bag comprises:
   a front portion;
   a rear portion;
   a plastic material;
   at least two individual storage compartments separated by a partition;
   an interior portion of said plastic material on each of said front portion and said rear portion of said bag;
   an exterior portion of said plastic material on each of said front portion and said rear portion of said bag;
   a first set of a plurality of arrow-like projections of equivalent size extending from a first protruding base on said exterior portion on said front of said bag;
   a plurality of bulb-like projections of equivalent size extending from a second protruding base on said interior portion on said front portion of said bag;
   a center bulb-like post extending from said second protruding base on said interior portion on said front portion of said bag, wherein said center bulb-like post is longer in length than said plurality of bulb-like projections and is positioned in between said plurality of bulb-like projections;
   a plurality of cuffs of equivalent size extending from a third protruding base on said interior portion on said rear portion of said bag, wherein said plurality of cuffs are dimensioned and configured to cup said plurality of bulb-like projections, and wherein said center bulb-like post is positioned in between said plurality of cuffs and comprises a length dimensioned and configured to reach said third protruding base from said second protruding base;
   a second set of a plurality of arrow-like projections of equivalent size extending from a fourth protruding base on said exterior portion on said rear of said bag, wherein a plurality of arrow-like projections from a first bag of said plurality of bags are dimensioned and configured to interlock with a plurality of arrow-like projections from a second bag of said plurality of bags; and
   a gap between each of said plurality of cuffs and said interior portion of said rear portion of said bag, wherein of each of said second set of a plurality of arrow-like projections are substantially aligned with said gap, and wherein said gap extends from said interior portion of said plastic material on said rear portion of said bag and extends no further than a width of said third protruding base towards a cuff of said plurality of cuffs.

2. The system of claim 1, wherein said partition comprises a sealable device.

3. The system of claim 1, wherein said partition comprises a seal.

4. The system of claim 1, further comprising a pair of sealable devices on opposite ends of a bag of said plurality of bags.

5. The system of claim 4, further comprising a partition in between said pair of sealable devices.

6. The system of claim 5, wherein said partition comprises a seal.

7. The system of claim 5, wherein said partition comprises a perforated and detachable seal.

8. The system of claim 1, further comprising a first sealable device on a first end of a bag of said plurality of bags.

9. The system of claim 8, further comprising a seal on a second end of said bag of said plurality of bags.

10. The system of claim 9, further comprising a second sealable device in between said first sealable device and said seal.

11. A plastic storage bag system comprising a plurality of plastic bags operatively connected to one another, wherein each bag comprises:
   a front portion;
   a rear portion;
   a plastic material;
   at least two individual storage compartments separated by a partition;
   an interior portion of said plastic material on each of said front portion and said rear portion of said bag;
   an exterior portion of said plastic material on each of said front portion and said rear portion of said bag;
   a first set of a plurality of arrow-like projections of equivalent size extending from a first protruding base on said exterior portion on said front of said bag;
   a plurality of bulb-like projections of equivalent size extending from a second protruding base on said interior portion on said rear portion of said bag;
   a center bulb-like post extending from said second protruding base on said interior portion on said rear portion of said bag, wherein said center bulb-like post is longer in length than said plurality of bulb-like projections and is positioned in between said plurality of bulb-like projections;

a plurality of cuffs of equivalent size extending from a third protruding base on said interior portion on said front portion of said bag, wherein said plurality of cuffs are dimensioned and configured to cup said plurality of bulb-like projections, and wherein said center bulb-like post is positioned in between said plurality of cuffs and comprises a length dimensioned and configured to reach said third protruding base from said second protruding base;

a second set of a plurality of arrow-like projections of equivalent size extending from a fourth protruding base on said exterior portion on said rear of said bag, wherein a plurality of arrow-like projections from a first bag of said plurality of bags are dimensioned and configured to interlock with a plurality of arrow-like projections from a second bag of said plurality of bags; and a gap between each of said plurality of cuffs and said interior portion of said front portion of said bag, wherein of each of said second set of a plurality of arrow-like projections are substantially aligned with said gap, and wherein said gap extends from said interior portion of said plastic material on said front portion of said bag and extends no further than a width of said third protruding base towards a cuff of said plurality of cuffs.

12. The system of claim 11, wherein said partition comprises a sealable device.

13. The system of claim 11, wherein said partition comprises a seal.

14. The system of claim 11, further comprising a pair of sealable devices on opposite ends of a bag of said plurality of bags.

15. The system of claim 14, further comprising a partition in between said pair of sealable devices.

16. The system of claim 15, wherein said partition comprises a seal.

17. The system of claim 15, wherein said partition comprises a perforated and detachable seal.

18. The system of claim 11, further comprising:

a first sealable device on a first end of a bag of said plurality of bags;

a seal on a second end of said bag of said plurality of bags; and a second sealable device in between said first sealable device and said seal.

* * * * *